United States Patent
Weise et al.

(10) Patent No.: US 12,122,965 B2
(45) Date of Patent: Oct. 22, 2024

(54) POROUS MATERIAL FOR REMOVING IMPURITIES IN FEEDSTOCKS

(71) Applicant: TOPSOE A/S, Kgs. Lyngby (DK)

(72) Inventors: Christian Frederik Weise, Ballerup (DK); Michal Lutecki, København Ø (DK); Frank Bartnik Johansson, Roskilde (DK)

(73) Assignee: HALDOR TOPSØE A/S, Lyngby (DK)

( * ) Notice: Subject to any disclaimer, the term of this patent is extended or adjusted under 35 U.S.C. 154(b) by 87 days.

(21) Appl. No.: 18/000,578

(22) PCT Filed: Jul. 6, 2021

(86) PCT No.: PCT/EP2021/068656
§ 371 (c)(1),
(2) Date: Dec. 2, 2022

(87) PCT Pub. No.: WO2022/008508
PCT Pub. Date: Jan. 13, 2022

(65) Prior Publication Data
US 2023/0295525 A1    Sep. 21, 2023

(30) Foreign Application Priority Data

Jul. 7, 2020   (EP) .................................. 20184467

(51) Int. Cl.
| | | |
|---|---|---|
| *C10G 67/06* | (2006.01) | |
| *B01J 20/08* | (2006.01) | |
| *B01J 20/28* | (2006.01) | |

(52) U.S. Cl.
CPC .............. *C10G 67/06* (2013.01); *B01J 20/08* (2013.01); *B01J 20/28042* (2013.01);
(Continued)

(58) Field of Classification Search
CPC ............ C10G 67/06; C10G 2300/1011; C10G 2300/1033; C10G 2300/202;
(Continued)

(56) References Cited

U.S. PATENT DOCUMENTS

| | | |
|---|---|---|
| 4,510,092 A | 4/1985 | Rosen |
| 4,512,878 A | 4/1985 | Reid et al. |

(Continued)

FOREIGN PATENT DOCUMENTS

| | | |
|---|---|---|
| CA | 1209512 A | 8/1986 |
| DE | 3405858 A1 | 8/1984 |

(Continued)

OTHER PUBLICATIONS

Borodier et al, A Practical Guide to Microstructural Analysis of Cementitious Materials, Chapter 9, 420-442 (Year: 2016).*

(Continued)

*Primary Examiner* — Randy Boyer
*Assistant Examiner* — Juan C Valencia
(74) *Attorney, Agent, or Firm* — Boone IP Law (57) ABSTRACT

A porous material including alumina, the alumina including alpha-alumina, the porous material including one or more metals selected from Co, Mo, Ni, W and combinations thereof, and the porous material having a BET-surface area of 1-110 m²/g, a total pore volume of 0.50-0.80 ml/g, as measured by mercury intrusion porosimetry, and a pore size distribution (PSD) with at least 30 vol % of the total pore volume being in pores with a radius ≥400 Å, suitably pores with a radius ≥500 Å. A process for removing impurities such as phosphorous (P) from a feedstock, by contacting the feedstock with a guard bed including the above porous material. A guard bed for a hydrotreatment system including the porous material, a hydrotreatment system including a guard bed which includes the porous material and a down- (Continued)

stream hydrotreatment section including at least one hydrotreatment catalyst.

32 Claims, 4 Drawing Sheets

(52) U.S. Cl.
CPC ... *B01J 20/28059* (2013.01); *B01J 20/28061* (2013.01); *B01J 20/28073* (2013.01); *B01J 20/28088* (2013.01); *C10G 2300/1011* (2013.01); *C10G 2300/1033* (2013.01); *C10G 2300/202* (2013.01)

(58) Field of Classification Search
CPC ... C10G 25/003; B01J 20/08; B01J 20/28042; B01J 20/28059; B01J 20/28061; B01J 20/28073; B01J 20/28088; B01J 20/28014; B01J 2220/42; B01J 20/28085; B01J 20/3204; B01J 20/0218; B01J 20/0225; B01J 20/3236; B01J 21/04; B01J 23/28; B01J 23/30; B01J 23/75; B01J 23/755; B01J 35/30; B01J 35/612; B01J 35/613; B01J 35/635; B01J 35/66; Y02P 30/20

See application file for complete search history.

(56) References Cited

U.S. PATENT DOCUMENTS

| | | | |
|---|---|---|---|
| 4,587,012 A * | 5/1986 | Quann | B01J 35/613 |
| | | | 208/216 PP |
| 5,079,208 A * | 1/1992 | Lammers | B01J 20/28083 |
| | | | 502/238 |
| 5,879,642 A | 3/1999 | Trimble et al. | |
| 10,239,754 B1 * | 3/2019 | Tiwari | C01B 3/50 |
| 2004/0077737 A1 | 4/2004 | Eri et al. | |
| 2008/0135455 A1 | 6/2008 | Coupard et al. | |
| 2011/0138680 A1 | 6/2011 | Dandeu et al. | |

FOREIGN PATENT DOCUMENTS

| | | | |
|---|---|---|---|
| EP | 0376406 A1 | 7/1990 | |
| EP | 714699 A2 * | 6/1996 | B01J 21/04 |

OTHER PUBLICATIONS

"Technology and Engineering for Liquid Biofuels", Twelfth Five-year Plan National key, Jan. 31, 2013, pp. 271-275.

International Preliminary Report on Patentability received for PCT Patent Application No. PCT/EP2021/068656, mailed on Jan. 19, 2023, 7 pages.

Office Action received for Chinese Patent Application No. 202180046007.5, mailed on Jan. 16, 2024, 20 pages (10 pages of English Translation and 10 pages of Original Document).

European Search Report dated Dec. 3, 2020, issued by the European Patent Office in corresponding European Application No. 20184467.7. (7 pages).

International Search Report (PCT/ISA/210) and Written Opinion (PCT/ISA/237) mailed on Sep. 15, 2021, by the European Patent Office as the International Searching Authority for International Application No. PCT/EP2021/068656. (13 pages).

* cited by examiner

POROUS MATERIAL FOR REMOVING IMPURITIES IN FEEDSTOCKS

FIELD OF THE INVENTION

The present invention relates to a porous material comprising alumina, in particular a porous material for removing impurities in feedstocks. The porous material comprises alumina including alpha-alumina and optionally theta-alumina. The porous material includes also at least one metal selected from Co, Mo, Ni, W and combinations thereof, and has a BET surface area of 1-110 $m^2/g$. The porous material has a total pore volume of 0.50-0.80 ml/g, such as 0.50-0.75 ml/g, or 0.55-0.70 ml/g, or 0.60-0.70 ml/g as measured by mercury intrusion porosimetry, and a pore size distribution (PSD) with at least 30 vol % of the total pore volume, such as at least 40 vol %, at least 50 vol %, or at least 60 vol % being in pores with a radius ≥400 Å (40 nm) suitably in pores with a radius ≥500 Å (50 nm), such as pores with a radius up to 5000 Å (500 nm). The invention relates also to a process for removing one or more impurities, for instance phosphorous (P), from a feedstock containing impurities such as a renewable feed, by contacting said feedstock with a guard bed comprising the above porous material. The invention further relates to a guard bed for a hydrotreatment system comprising the porous material, a hydrotreatment system comprising a guard bed which comprises the porous material and a downstream hydrotreatment section (hydrotreatment stage) comprising at least one hydrotreatment catalyst, as well as to the use of the porous material as a phosphorus guard in a hydrotreatment process. The invention further relates to said porous material, yet without comprising the metals and its use as phosphorus guard in a hydrotreatment process.

BACKGROUND OF THE INVENTION

Renewable fuels may be produced from a broad variety of sources including animal fats and vegetable oils but also tall oil, pyrolysis oils and other non-edible compounds. Before feedstocks derived from renewable organic material can be used in conventional automobile engines, aviation turbines, marine engines or other engines, and distributed using existing fuel infrastructure, it is desirable to convert the material into hydrocarbons similar to those present in petroleum-derived transportation fuels. One well-established method for this purpose is the conversion of vegetable oils into normal paraffins in the gasoline, jet fuel or diesel boiling range by employing a hydrotreating process.

In a hydrotreating process, the renewable organic material is reacted with hydrogen at elevated temperature and pressure in a catalytic reactor.

A particular problem with feedstocks such as renewable feedstocks is that they contain impurities such as phosphorus-containing or silicon-containing species. Phosphorus-containing species may take the form of phospholipids such as lecithin, from seed oils. Waste lube oils can also contain species such as zinc dialkyl dithio phosphates (ZDDP), which acts as an anti-wear additive in such lubricants. Phosphorus (P) quickly deactivates conventional catalysts for hydrotreating and reduces cycle length dramatically. The refiners processing renewable feedstocks are forced to load more material for guarding the hydrotreating catalyst compared to fossil fuel-based refining processes. The units often employ pre-treatment of the feedstocks using washing and/or adsorbents to reduce P from 10-20 ppm down to 1-2 ppm, but even at 1-2 ppm, guard materials are needed.

Thus, refiners processing renewables, whether by using only renewables as the feedstock, or a mixture of renewables and fossil fuels i.e. co-processing, uniformly express the need for better guard materials for particularly P capture to prevent pressure drop and deactivation of their bulk catalysts. It is therefore vital to reduce, or—if possible—remove, impurities, particularly phosphorus-containing species before reaching the bulk catalyst.

The concept of "guard beds" for catalytic processes are known. For instance, from U.S. Pat. No. 5,879,642. An upstream catalyst bed functions as a guard catalyst bed for removing a major proportion of impurities from a hydrocarbon feed stream in order to extend the life of one or more catalyst beds located underneath (downstream) the guard catalyst bed.

U.S. Pat. No. 9,447,334 (US 2011/138680) discloses a process for converting feeds derived from renewable sources with pre-treatment of feeds, whereby upstream of the hydrotreatment step, a step for intense pre-treatment for eliminating hetero-elements such as phosphorus which are insoluble under hydrotreatment conditions, is conducted. This step includes the use of an adsorbent free of catalytic material (free of catalytic metals), having a high surface area e.g. 140 $m^2/g$ and high total pore volume e.g. 1.2 ml/g.

US 2004/077737 discloses a catalyst for use for Fischer-Tropsch synthesis which comprises 3-35 wt % cobalt supported on alumina, the alumina support having a surface area of <50 $m^2/g$ and/or is at least 10% alpha-alumina. The cobalt (Co) is suitably combined with the metal promoters Re or Pt. In particular, where Co is promoted with Re or Pt, the content of Co in the catalyst is 5 wt % or higher. When using only Co in the catalyst, its content is 12 wt % or higher.

U.S. Pat. No. 4,510,092 discloses a method of continuously hydrogenating fatty materials, in particular liquid vegetable oils, over a nickel on alpha-alumina catalyst whose surface area is <10 $m^2/g$, the micropore volume is <0.1 ml/g and the macropore volume is <0.6 ml/g, preferably <0.3 ml/g. By micropore volume is meant the total volume of pores under about 117 Å in size; while by macropore volume is meant the total volume of pores greater than about 117 Å in size. The nickel content is high, namely 1-25%.

U.S. Pat. No. 4,587,012 discloses a process for upgrading a hydrocarbonaceous stream for removing the metal impurities nickel, vanadium and iron, using a catalyst which comprises more than 80% alpha-alumina. The catalyst material has a pore volume (PV) of only about 500 ml/kg (0.5 ml/g) and no more than 10% macropores, i.e. there is no more than 10% of PV being in pores with radius >500 Å (diam. >1000 Å).

Conventional and commercially-available guard bed materials used for P capture are in the form of a catalyst made of high pore volume gamma-alumina carrier with low metal content for hydrotreating activity.

Often, the use of metals in the guard material, particularly metals having hydrotreating activity such as Mo or Ni, results in undesired coking, which translates into plugging of the guard bed and thereby inexpedient pressure drop. Too high activity reached by high metals or promotion lead to coking due to hydrogen starvation around the catalyst and high temperature due to exotherms.

Despite recent progress in the field, there is a need for improved materials, in particular porous materials for use in guard beds for removing of impurities such as P, in particular also for feedstocks comprising a significant portion of renewables including a feedstock with 100% renewables, i.e. a 100% renewable feed.

SUMMARY OF THE INVENTION

It is an object of the present invention to provide a material comprising one or more metals with hydrotreating activity that is capable of capturing impurities, particularly P, in hydrocarbon feedstocks, and which minimize coking during operation.

It is another object of the present invention to provide a material with a higher P penetration and thereby improved P-capture than conventional materials.

It is a further object of the present invention to provide a material with high capacity for capturing impurities, particularly P, in a feedstock originating from a renewable source, or a feedstock combining a renewable source and a fossil fuel.

These and other objects are solved by the present invention.

Accordingly, in a first aspect the invention is a porous material, in particular a porous material for removing one or more impurities from a feedstock, comprising alumina,
said alumina comprising alpha-alumina,
said porous material comprising one or more metals selected from Co, Mo, Ni, W, and combinations thereof,
said porous material having a BET-surface area of 1-110 m²/g, wherein,
the porous material has a total pore volume of 0.50-0.80 ml/g, such as 0.50-0.750 ml/g, or 0.55-0.70 ml/g, or 0.60-0.7 ml/g (600-700 ml/kg), as measured by mercury intrusion porosimetry, and
the porous material has a pore size distribution (PSD) with at least 30 vol % of the total pore volume, such as at least 40 vol %, at least 50 vol %, or at least 60 vol % being in pores with a radius ≥400 Å (40 nm) suitably in pores with a radius ≥500 Å (50 nm), such as pores with a radius up to 5000 Å (500 nm).

In an embodiment according to the first aspect of the invention, up to 60 vol % of the total pore volume, such as up to 40 vol % of the total pore volume is in pores with a radius below 400 Å, such as pores with a radius down to 40 Å, or down to 80 Å.

The mercury intrusion porosimetry is conducted according to ASTM D4284.

While the bigger pores with radius equal to or above 400 Å, or equal to or above 500 Å, serve for the P-capture, the smaller pores with radius below 400 Å enable better use of the one or more metals in the porous material for providing hydrotreating activity. The porous material may for instance show a broad peak as a unimodal pore system or show a bimodal or even trimodal pore system, in which particularly the smaller pores add the possibility for providing the hydrotreating activity to the porous material.

The BET-surface area is measured according to ASTM D4567-19, i.e. single-point determination of surface area by the BET equation.

In an embodiment according to the first aspect of the invention, the content of alpha-alumina is 50-100 wt % such as 65-95 wt %, or 60-80 wt %, as determined by XRD.

In an embodiment according to the first aspect of the invention, the alumina further comprises theta-alumina and optionally gamma-alumina.

In an embodiment according to the first aspect of the invention, the content of theta-alumina is 0-50 wt % such as 35-45 wt %, or 30-40 wt %, as determined by XRD.

In an embodiment according to the first aspect of the invention, the content of gamma-alumina is 0-10 wt %, such as 5 wt % or less e.g. 1 wt %, as determined by XRD.

Accordingly, in a particular embodiment, the content of gamma-alumina is 0 wt %, i.e. the porous material is free of gamma-alumina.

In an embodiment according to the first aspect of the invention, the content of the one or more metals is 0.25-20 wt %, such as 0.25-15 wt %, 0.25-10 wt %, or 0.25-5 wt %.

A combination of the above features is also encompassed. Accordingly, in an embodiment according to the first aspect, the content of alpha-alumina is 50-100 wt % such as 65-95 wt %, the content of theta-alumina is 0-50 wt % such as 35-45 wt %, and the content of gamma-alumina is 0-10 wt %, such as 5 wt % or less e.g. 1 wt %, as determined by XRD, and the content of the one or more metals is 0.25-20 wt %, such as 0.25-15 wt %, 0.25-10 wt %, or 0.25-5 wt %.

The XRD (X-Ray Diffraction) is conducted according to a standard XRD analysis, in which powder X-ray diffraction patterns are collected on an XPertPro instrument configured in Bragg-Brentano mode using Cukalpha radiation, and Rietveld analysis using the TOPAS software is used to quantify the phase composition.

Without being bound by any theory, it is believed that the formation of the alpha-alumina and optionally also theta-alumina as the main alumina phases of the porous material, contrary to e.g. a predominantly gamma-alumina phase in conventional materials or catalysts, results in that the surface reactivity of the porous material towards P-species is drastically reduced. Thereby the reactivity towards P-species is also reduced so that P is not only captured on the surface of the porous material. At the same time, the porous material, showing increased pore size, allows for better penetration of the feed, in particular renewable feed, and thereby penetration of P-species. Moreover, it has also been found that the use of one or more metals having hydrotreating activity show significantly less coking on the porous material, which again, without being bound by any theory, may be attributed to the metal, e.g. Mo, blocking the remaining acidic sites or to some small hydrogenation activity of the porous material when the metal is present.

In an embodiment according to the first aspect, the porous material further comprises a compound selected from Al-borates such as $Al_5BO_9$, calcium aluminates, silicon aluminates, and combinations thereof. These compounds may be present in crystalline form.

In a particular embodiment, the sum of theta, alpha and gamma alumina and any optional of the above compounds present in crystalline form such as calcium aluminates, as determined by XRD, adds to 100 wt %.

In another particular embodiment, the porous material is absent of said compounds. Hence, the sum of theta, alpha and gamma alumina, as determined by XRD, adds to 100 wt %.

During preparation of the porous material, a starting (precursor) material comprising alumina and particularly having a substantial amount of gamma-alumina, such as 50 wt % or more as measured by XRD, is calcined in air at temperatures of 1050° C. or higher, such as 1100° C. or 1200° C. or 1300° C. or 1400° C., for 1-10 hours, for instance 4, 6, or 8 hours; an example being 1100° C. for 2 hours, thereby transforming gamma-alumina into alpha-alumina and theta alumina. Other alumina precursors such as boehmite may also be used in the preparation, for instance as a binder.

The addition of an additive such as boric acid ($H_3BO_3$), a calcium containing compound, e.g. calcium nitrate (Ca($NO_3$)$_2$), or silica ($SiO_2$) to the material during its preparation, i.e. to the starting material, allows for a better control of sintering and/or transformation to especially the alumina phase during the calcination, thereby rendering a more smooth and robust transition. Better control of the surface area and the pore size is thereby also achieved. Hence, the additive acts as a stabilizing agent during the preparation of the porous material.

When such additives are used, these are then present in the porous material as e.g. $SiO_2$ and/or in the alumina as e.g. Al-borate, Ca-aluminates or Si-aluminates.

In another embodiment, the starting material comprising alumina, for instance an alumina carrier, is a material which has been pre-calcined at temperatures of 450-850° C., preferably 450-750° C.

The guard material has some (albeit low) hydrotreating activity to avoid coking and high exothermicity when contacting the feed with the main downstream catalyst bed for hydrotreating. The most reactive molecules in the feed are converted, thereby reducing the risk of excessive temperature rise which can lead to gumming. Hence, by the invention a trade-off is realized: no metals will cause coking in the material, too much metal activity will cause coking and gumming due to too high exotherms. The low metal content, for instance 15 wt % Mo, 10 wt % Mo, 5 wt % Mo, or lower such as 3 wt % Mo, 1 wt % Mo, or 0.5 wt % Mo, suitably in the corresponding ranges as recited below, seems to be just right to balance out these two deactivation effects. Furthermore, some preheating prior to the feed reaching the bulk catalyst is also achieved.

In an embodiment according to the first aspect, the one or more metals comprise Mo and its content is 0.5-15 wt %, such as 0.5-10 wt %, or 0.5-5 wt %, or 0.5-3 wt %, for instance 0.5-1.5 wt % or 0.5-1 wt % such as 0.7 or 0.9 wt %, or 1-2 wt %, and optionally further comprises 0.1-5 wt %, such as 0.1-3 wt %, 0.1-1 wt %, 0.1-0.5 wt %, or 0.1-0.2 wt % of at least one of Ni, Co, and W. In another embodiment according to the first aspect, the one or more metals comprise Mo and its content is 0.5-15 wt %, such as 0.5-10 wt %, or 0.5-5 wt %, or 0.5-3 wt %, for instance 0.5-1.5 wt % such as 0.7 or 0.9 wt %, or 1-2 wt %, and optionally further comprises 0.05-0.5 wt % of Ni; optionally also the porous material does not comprise one or more metals selected from Co, W i.e. the porous material is free of Co and/or W.

In a particular embodiment, the at least one or more metals is Mo. In another particular embodiment, the one or more metals are Mo and Ni. Hence, the porous material does not comprise one or more metals selected from Co, W. For instance, the porous material may comprise 0.5-1.5 wt % Mo, such as 1 wt % Mo, and 0.1-0.2 wt % Ni. Due to the low surface area of the pore material, the Mo load (Mo content) is lowered, yet by adding e.g. Ni as promoter, it is possible to compensate for the low metal content. Furthermore, despite the low surface area of the porous material of the invention, a small amount of molybdenum e.g. 0.5-3 wt % Mo, such as about 1 wt % results in a significantly lower coke formation. The use of molybdenum is in particular advantageous when operating with 100% renewable feedstock, as the P-capture significantly increases with respect to when the molybdenum is not present in the porous material. In addition, the presence of a small amount of nickel e.g. 0.05-0.5 wt % Ni, such as about 0.1 wt % Ni, further reduces coke formation.

The present invention does not require the use of any metals to provide for P-capture, yet the addition of Mo turns out to reduce coking significantly and enables also the desired effect of achieving an activity gradient in the unit comprising the porous material anyway. Furthermore, while addition of Co or Ni as a promoter may be desirable since it increases activity dramatically, this may be really detrimental for the downstream hydrotreatment section comprising at least one hydrotreatment catalyst. More specifically, it may be really detrimental for hydrotreatment/hydrodeoxygenation (HDO) selectivity (yield loss) when processing renewable feedstocks. While it is desirable that oxygen removal from the renewable feedstock in the HDO proceeds mainly by removing $H_2O$, having particularly nickel in amounts higher than about 0.5 wt % results in undesired decarboxylation, thus reducing HDO selectivity.

The material catalytically active in hydrotreating/HDO, typically comprises an active metal (sulfided base metals such as nickel, cobalt, tungsten and/or molybdenum, but possibly also either elemental noble metals such as platinum and/or palladium) and a refractory support (such as alumina, silica or titania, or combinations thereof).

Hydrotreating conditions involve a temperature in the interval 250-400° C., a pressure in the interval 30-150 bar, and a liquid hourly space velocity (LHSV) in the interval 0.1-2, optionally together with intermediate cooling by quenching with cold hydrogen, feed or product.

In an embodiment according to the first aspect, the BET-surface area is 1-70 $m^2/g$, such as 1-60 $m^2/g$, or 1-30 $m^2/g$, such as 10-30 $m^2/g$ e.g. 15-25 $m^2/g$, or 1-28 $m^2/g$, 5-28 $m^2/g$, 10-28 $m^2/g$, 15-28 $m^2/g$, 20-28 $m^2/g$, 20-25 $m^2/g$, 5-20 $m^2/g$, or combinations thereof. Particular embodiments are 3-15 $m^2/g$ e.g. 9-10 $m^2/g$; or 25-30 $m^2/g$, 40-45 $m^2/g$, or 50-55 $m^2/g$.

In an embodiment according to the first aspect, the at least one metal is in the form of oxides or sulfides.

In an embodiment according to the first aspect, the porous material is an extruded or tabletized pellet having a shape selected from trilobal, tetralobal, pentalobal, cylindrical, spherical, hollow such as hollow rings or hollow cylinders, and combinations thereof.

Figure 4:
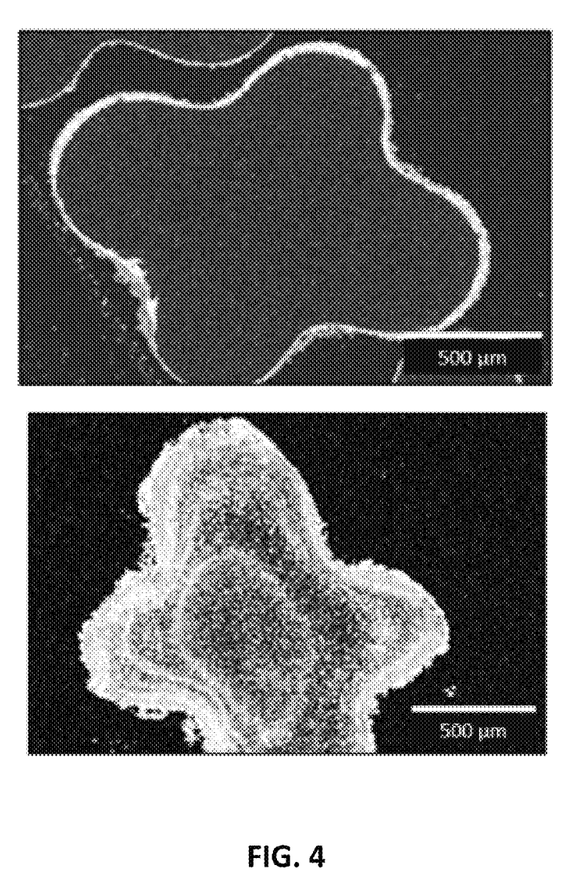
FIG. 4 shows SEM (scanning electron microscope) pictures of P-capture in samples according to the prior art (low penetration of P) and according to the invention (deep penetration of P).

Pellets having tetralobal shape, as for instance shown in FIG. 4, are particularly advantageous, due to improved outer surface area to volume ratio.

In a second aspect, the invention encompasses also a process for removing one or more impurities from a feedstock, said process comprising the step of contacting said feedstock with a guard bed comprising a porous material according to any one of the preceding embodiments, thereby providing a purified feedstock.

In an embodiment according to the second aspect of the invention, the one or more impurities are selected from a vanadium-containing impurity, silicon-containing impurity, a halide-containing impurity, an iron-containing impurity, a phosphorous-containing impurity, and combinations thereof. Preferably, the one or more impurities is a phosphorous (P)-containing impurity.

In an embodiment according to the second aspect of the invention, the process is carried out at high temperature such as 100-400° C., for instance 250-350° C., optionally in the presence of a reducing agent such as hydrogen.

In an embodiment according to the second aspect of the invention the feedstock is:
i) a renewable source obtained from a raw material of renewable origin, such as originating from plants, algae, animals, fish, vegetable oil refining, domestic waste, waste rich in plastic, industrial organic waste like tall oil or black liquor, or a feedstock derived from one or more oxygenates taken from the group consisting of triglycerides, fatty acids, resin acids, ketones, aldehydes or alcohols where said oxygenates originate from one or more of a biological source, a gasification process, a pyrolysis process, Fischer-Tropsch synthesis, or methanol based synthesis. The oxygenates may also originate from a further synthesis process. Some of these feedstocks may contain aromatics; especially products from pyrolysis processes or waste products from e.g. frying oil. Any combinations of the above feedstocks are also envisaged.

The feedstock can also be:
ii) a feedstock originating from a fossil fuel, such as diesel, kerosene, naphtha, vacuum gas oil (VGO), spent lube oil, or combinations thereof;
or
iii) a feedstock originating from combining a renewable source according to i) and a feedstock originating from a fossil fuel according to ii)

In the context of the present invention, the terms "renewable source" and "renewable feed" are used interchangeably.

In a particular embodiment, the portion of the feedstock originating from a renewable source is 5-60 wt %, such as 10 or 50 wt %. In another particular embodiment, the portion of the feedstock originating from a renewable source is higher than 60 wt %, for instance 70-90 wt %.

In an embodiment according to the second aspect of the invention, the one or more impurities is a phosphorous (P)-containing impurity and said feedstock contains 0.5-1000 ppm P. The content of P may vary significantly depending on feedstock. For instance, 50-60 ppm P in oils derived from oxygenates originated from a pyrolysis process e.g. pyrolysis oil, or 100-300 ppm e.g. 200 ppm for a feedstock originating from animals, particularly animal fat.

In an embodiment according to the second aspect of the invention, the purified feedstock is subsequently processed in a hydrotreatment stage in the presence of a hydrotreatment catalyst. In a particular embodiment, the hydrotreatment stage is directly downstream with optional heating/cooling in between. In another particular embodiment, the hydrotreatment catalyst preferably comprises at least one metal selected from Co, Mo, Ni, W and combinations thereof.

In a third aspect, the invention encompasses a guard bed for a hydrotreatment system, said guard bed comprising a porous material according to the first aspect of the invention.

In a fourth aspect, the invention encompasses a hydrotreatment system for hydrotreating a feedstock, said hydrotreatment system comprising:
a guard bed comprising a porous material according to the first aspect of the invention; and
a hydrotreatment section comprising at least one hydrotreatment catalyst, arranged downstream of said guard bed.

In a fifth aspect, the invention encompasses also the use of a porous material according to the first aspect of the invention as a phosphorus guard in a hydrotreatment process.

In a sixth aspect, the porous material is metal-free, e.g. the porous material does not comprise one or more metals selected from Co, Mo, Ni, W, and combinations thereof.

The present invention does not require the use of any metals to provide for P-capture. Accordingly, there is also provided a porous material comprising alumina,
said alumina comprising alpha-alumina,
said porous material not comprising one or more metals selected from Co, Mo, Ni, W, and combinations thereof,
said porous material having a BET-surface area of 1-110 m$^2$/g, wherein the porous material has a total pore volume of 0.50-0.80 ml/g, such as 0.50-0.75 ml/g, or 0.55-0.70 ml/g, or 0.60-0.70 ml/g, as measured by mercury intrusion porosimetry, and
the porous material has a pore size distribution (PSD) with at least 30 vol % of the total pore volume, such as at least 40 vol %, at least 50 vol %, or at least 60 vol % being in pores with a radius ≥400 Å suitably in pores with a radius ≥500 Å, such as pores with a radius up to 5000 Å.

Any of the embodiments according to the first aspect of the invention may be used together with any of the embodiments according to the second, third, fourth, fifth and sixth aspect of the invention, or vice versa. It would also be understood, that embodiments according to the first to fifth aspects which are related to the use of one or more metals selected from Co, Mo, Ni, W and combinations thereof, are not used together with the sixth aspect of the invention.

DETAILED DESCRIPTION

Examples

A porous material according to the invention is packed together with a reference porous material, i.e. a conventional and commercially available refinery catalyst having a predominantly gamma-alumina carrier impregnated with 3 wt % Mo, in separate compartments, and for a period of time, normally 8-12 months, brought into contact with a mixture of 50% renewable feed and 50% fossil feed, and with a 100% renewable feed, under hydrotreatment conditions. Prior to testing, the samples are analyzed by XRD for determination of e.g. alumina phases. At the end of the testing, the samples are rinsed by extraction with xylene, dried in vacuum and analysed for metals/P capture (XRF, X-ray fluorescence analysis according to EN ISO 12677: 2011), SEM, Carbon and Sulphur (C+S; LECO analysis, ASTM E1915-13) and BET-surface area (ASTM D4567-19).

For determination of alumina phases, XRD is used. Accordingly, powder X-ray diffraction patterns were collected on an XPertPro instrument configured in Bragg-Brentano mode using Cukalpha radiation. Rietveld analysis using the TOPAS software was used to quantify the phase composition.

For determination of total pore volume and pore size distribution, mercury intrusion porosimetry is conducted according to ASTM D4284.

The porous materials were prepared by calcination at high temperatures of 1100-1200° C. in air for 2-3 hours and without addition of additives of alumina materials used as catalyst carriers and comprising 50 wt % or more gamma-alumina.

Figure 1:
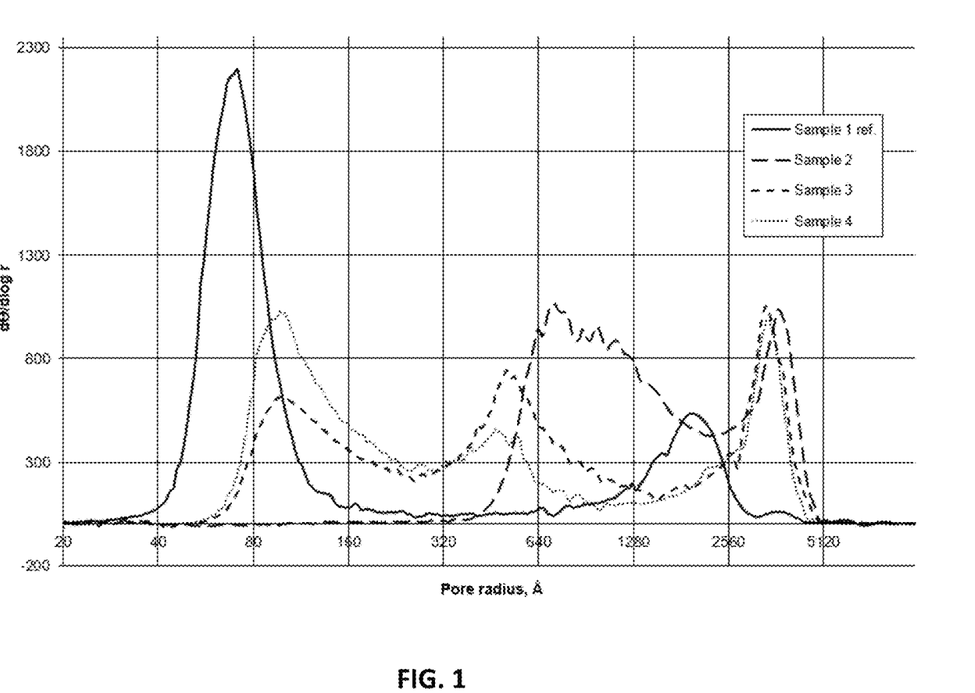
FIG. 1 shows the pore size distribution (PSD) by mercury intrusion porosimetry of porous materials according to the invention.

FIG. 1 shows the PSD of four samples used in the testing. Note that the X-axis is logarithmic. Sample 1 is the reference according to the prior art, i.e. the above mentioned conventional and commercially available refinery catalyst having a predominantly gamma-alumina carrier. Samples 2-4 are porous materials according to the invention. It is observed that for the samples according to the invention, a significant portion of the pores have a pore radius 400 Å and above, or 500 Å and above. The formation of these big pores which serve for the P-capture is attributed to the formation of alpha-alumina and optionally also theta-alumina.

The smaller pores below 400 Å or below 500 Å may be advantageous to promote some hydrotreating capability to the porous materials. Hence, samples 3-4 in particular provide small pores to accommodate a little amount of the metal, for instance about 1 wt % Mo.

The balance of finding a porous material which has a high capacity for impurity capture, in particular P-capture, while at the same time being able to accommodate metals for hydrotreating, yet without promoting coking, is very delicate. Big pores as such do not guarantee a better guard. For instance, the peaks in the pore region in FIG. 1 above 2500 Å up to about 5000 Å do not necessarily make the corresponding porous materials (samples 2 to 4) a better guard material than a similar porous material, i.e. one having at least 30 vol % of the total pore volume in pores with a radius equal to or above 400 Å or radius equal to or above 500 Å, yet not showing a peak in this pore region 2500-5000 Å, or with no pores in this region (2500-5000 Å). At the same time, simply having a porous material with a significant amount of micropores or pores below about 80 Å or below 40 Å, as is normally wanted to provide high surface area for the deposition of metals and thereby catalytic hydrotreating activity, impairs the capacity of the porous material as a P-guard by micropores blocking the access to bigger pores.

Figure 2:
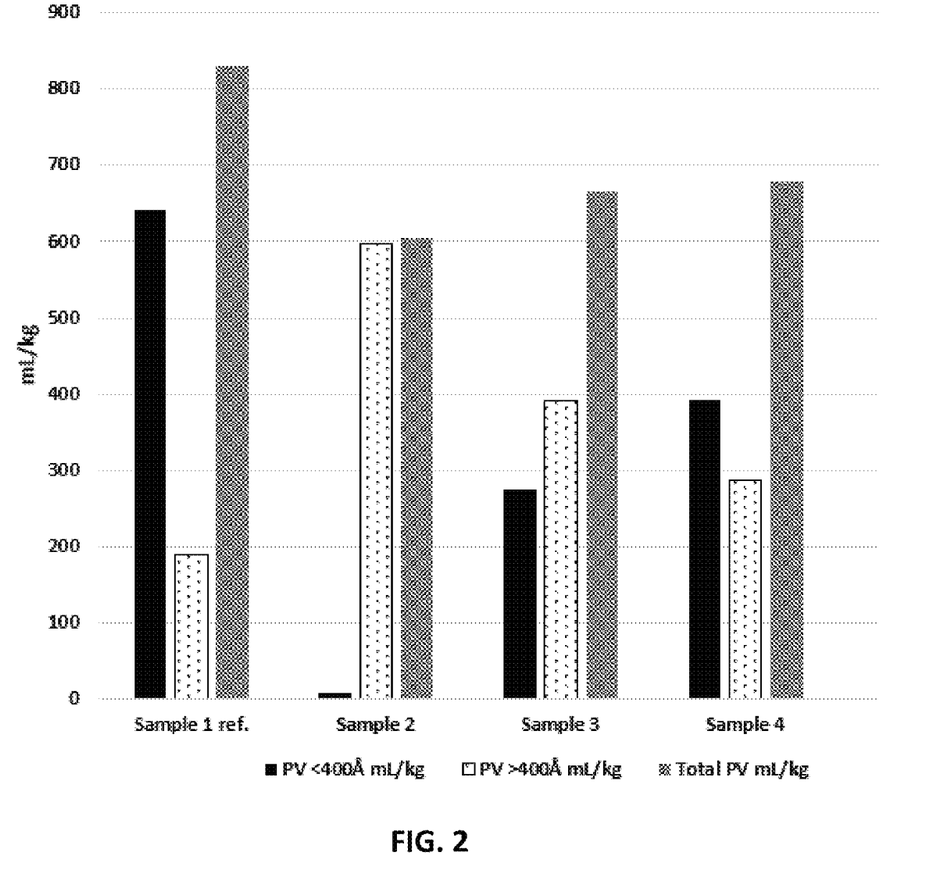
FIG. 2 shows the pore volume distribution and total pore volume by mercury intrusion porosimetry of porous materials according to the invention.
Figure 3:
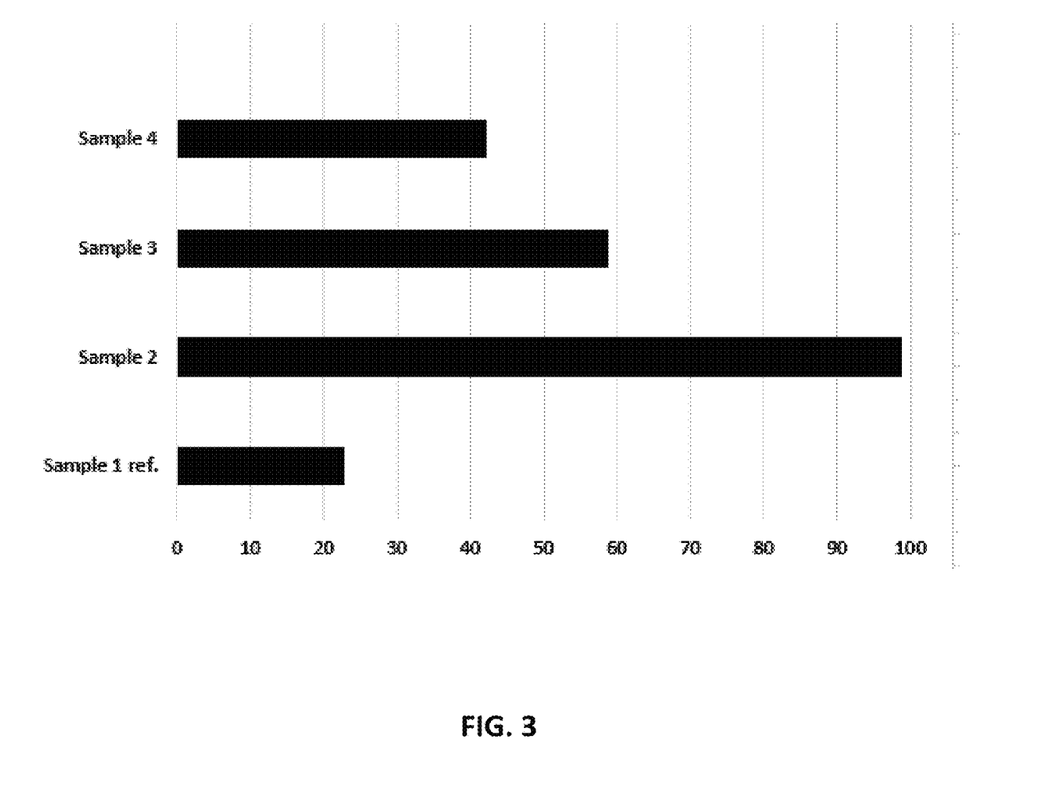
FIG. 3 shows in the X-axis the vol. % of pores having radius greater than 400 Å.

FIG. 2 and FIG. 3 show the total pore volume (PV) and corresponding distribution of pores. Porous materials corresponding to samples 2 to 4 according to the invention show total pore volumes in the range 0.50-0.80 ml/g, more specifically about 0.60 ml/g, with at least 30% of the total pore volume in pores with radius above 400 Å. For instance, sample 2 being about 90 wt % alpha-alumina and about 10 wt % theta-alumina, shows 99% of the total pore volume in pores above 400 Å, while the reference sample 1 shows only about 20% of the total pore volume in pores above 400 Å.

Table 1 shows the content of the alumina phases in the samples, as measured by XRD. No additive was used in the preparation as stabilizing agent and thus no Al-borate, calcium aluminate or silicon-aluminate crystalline phases are detected.

TABLE 1

| Sample | Alpha-alumina (wt %) | Theta-alumina (wt %) | Gamma-alumina (wt %) | BET-surface area (m²/g) |
|---|---|---|---|---|
| 1-ref. | 0 | 0 | >95 | 150-200 |
| 2 | 98 | 2 | 0 | 9-10 |
| 3 | 68 | 32 | 0 | 40-45 |
| 4 | 48 | 52 | 0 | 50-55 |

Table 2 below shows the results of impurities-capture, in particular P and Fe, as well as coking (C wt %) with the porous materials from 50% renewables and 100% renewables in the feedstock.

The samples running with 50% renewables show up to 600% higher P-capture than the reference (sample 1). The samples running with 100% renewables show up to 51% more P-capture. It is also shown that if a small amount of Mo is present in the fresh porous material, for instance about 1 wt % Mo, coking decreases significantly (see underlined values) compared to the corresponding samples without metal (3', 4'). Surprisingly, despite the low surface area of the samples of the invention, the addition of e.g. 0.9 and 0.7 wt % Mo resulted in a significantly lower coke formation.

FIG. 4 shows SEM pictures of the penetration of P into the porous material having a tetralobal shape as P-maps (brighter means more P), with reference sample 1 (top) and sample 2 (bottom). For the reference sample it is observed that P is only present on the surface of the material, whereas in sample 2 a high level of P penetration takes place.

TABLE 2

| | Fresh porous material | | After use | | | |
|---|---|---|---|---|---|---|
| Sample | Renewables wt. % in feedstock | Mo in fresh porous material (wt %) | C (wt. %) | P-capture (kg/m³) | Relative P-capture | Fe-capture (kg/m³) |
| 1-ref. | 50 | 2.90 | 5.87 | 14.0 | 1 | 4.7 |
| 3 | 50 | 0.70 | 1.27 | 78.5 | 5.6 | 8.6 |
| 3' | 50 | — | 5.04 | 77.7 | 5.6 | 9.0 |
| 1-ref. | 100 | 2.90 | 3.05 | 43.3 | 1 | 5.5 |
| 4 | 100 | 0.92 | 3.91 | 65.5 | 1.5 | 5.2 |
| 4' | 100 | — | 17.10 | 55.1 | 1.3 | 5.3 |

Further experiments were conducted with another 100 wt % renewable feedstock, and with the content of the alumina phases in fresh porous materials (samples 5, 6, 7; see below Table 3), as measured by XRD, being about 70 wt % alpha-alumina and 30 wt % theta alumina, and surface area in the range 25-40 m²/g. Sample 1'-ref. is a new reference tested together with samples 5-7. Sample 1'-ref. has 100 wt % gamma alumina, a surface area of about 150 m²/g and contains slightly more molybdenum (about 3.1 wt %) than sample 1-ref. Again, no additive was used in the preparation as stabilizing agent and thus no Al-borate, calcium aluminate or silicon-aluminate crystalline phases are detected. Sample 5 is free of molybdenum and nickel. Sample 6 contains about 1 wt % of molybdenum. Sample 7 contains about 1.2 wt % molybdenum and additionally about 0.1 wt % nickel, more specifically 0.14 wt % Ni. All fresh porous materials (samples 1-7) are free of Co and/or W. The results for samples are shown in Table 3.

Significant P-capture is again achieved. Despite the low surface area of the samples of the invention, the addition of about 1 wt % Mo resulted in a significantly lower coke formation. By further addition of a small amount of nickel, about 0.1 wt %, coke formation is further reduced without significantly impairing P-capture.

The use of molybdenum optionally together with nickel is particularly more advantageous when operating with 100% renewable feedstock, as the P-capture significantly increases with respect to the samples not using molybdenum.

TABLE 3

| | Fresh porous material | | After use | | |
|---|---|---|---|---|---|
| Sample | Renewables wt. % in feedstock | Mo in fresh porous material (wt %) | C (wt. %) | P-capture (kg/m$^3$) | Relative P-capture | Fe-capture (kg/m$^3$) |
| 1'-ref. | 100 | 3.06 | 5.46 | 7.4 | 1 | 0.3 |
| 5 | 100 | — | 7.84 | 10.7 | 1.4 | 0 |
| 6 | 100 | 1.05 | 3.14 | 34.9 | 4.7 | 0.4 |
| 7* | 100 | 1.21 | 2.70 | 34.4 | 4.7 | 0.5 |

*Sample 7 is a NiMo porous material containing 0.14 wt % nickel

The invention claimed is:

1. A porous material comprising alumina, said alumina comprising alpha-alumina, said porous material comprising one or more metals selected from Co, Mo, Ni, W, and combinations thereof, said porous material having a BET-surface area of 1-110 m$^2$/g, wherein the porous material has a total pore volume of 0.50-0.80 ml/g, as measured by mercury intrusion porosimetry, and the porous material has a pore size distribution (PSD) with at least 30 vol % of the total pore volume being in pores with a radius ≥400 Å.

2. The porous material according to claim 1, with up to 60 vol % of the total pore volume being in pores with a radius below 400 Å.

3. The porous material according to claim 1, wherein the content of alpha-alumina is 50-100 wt %.

4. The porous material according to claim 1, the alumina further comprising theta-alumina.

5. The porous material according to claim 1, wherein the content of the one or more metals is 0.25-20 wt %.

6. The porous material according to claim 1, further comprising a compound selected from Al-borates, calcium aluminates, silicon aluminates, and combinations thereof.

7. The porous material according to claim 1, wherein the one or more metals comprise Mo and its content is 0.5-15 wt %.

8. The porous material according to claim 7, further comprising 0.1-5 wt % of at least one of Ni, Co, and W.

9. The porous material according to claim 7, further comprising 0.05-0.5 wt % of Ni.

10. The porous material according to claim 1, wherein the BET-surface area is 1-70 m$^2$/g.

11. The porous material according to claim 1, wherein the porous material is an extruded or tabletized pellet having a shape selected from trilobal, tetralobal, pentalobal, cylindrical, spherical, hollow, and combinations thereof.

12. The porous material according to claim 1, wherein the porous material has a total pore volume of 0.55-0.80 ml/g, as measured by mercury intrusion porosimetry.

13. The porous material according to claim 1, wherein the porous material has a total pore volume of 0.6-0.80 ml/g, as measured by mercury intrusion porosimetry.

14. The porous material according to claim 1, wherein the porous material has a pore size distribution (PSD) with at least 30 vol % of the total pore volume being in pores with a radius of 400 Å to 5000 Å.

15. The porous material according to claim 1, wherein the porous material has a pore size distribution (PSD) with at least 40 vol % of the total pore volume being in pores with a radius of 400 Å to 5000 Å.

16. The porous material according to claim 1, wherein the porous material has a pore size distribution (PSD) with at least 50 vol % of the total pore volume being in pores with a radius of 400 Å to 5000 Å.

17. The porous material according to claim 1, wherein the porous material has a pore size distribution (PSD) with at least 30 vol % of the total pore volume being in pores with a radius of 500 Å to 5000 Å.

18. The porous material according to claim 1, wherein the porous material has a pore size distribution (PSD) with at least 40 vol % of the total pore volume being in pores with a radius of 500 Å to 5000 Å.

19. The porous material according to claim 1, wherein the porous material has a pore size distribution (PSD) with at least 50 vol % of the total pore volume being in pores with a radius of 500 Å to 5000 Å.

20. The porous material according to claim 1, wherein the porous material has a pore size distribution (PSD) with 40 to 60 vol % of the total pore volume being in pores with a radius between 40 to 400 Å.

21. A process for removing one or more impurities from a feedstock, said process comprising the step of contacting said feedstock with a guard bed comprising a porous material according to claim 1, thereby providing a purified feedstock.

22. The process of claim 21, wherein the one or more impurities are selected from a vanadium-containing impurity, silicon-containing impurity, a halide-containing impurity, an iron-containing impurity, a phosphorous-containing impurity, and combinations thereof.

23. The process according to claim 21, which process is carried out at a temperature of 100-400° C.

24. The process according to claim 21, wherein the feedstock is:
    i) a renewable source obtained from a raw material of renewable origin; or
    ii) a feedstock originating from a fossil fuel; or
    iii) a feedstock originating from combining a renewable source according to i) and a feedstock originating from a fossil fuel according to ii).

25. The process according to claim 24, wherein the portion of the feedstock originating from a renewable source is 5-60 wt %.

26. The process according to claim 22, wherein the one or more impurities is a phosphorous (P)-containing impurity and said feedstock contains 0.5-1000 ppm P.

27. The process according to claim 21, wherein the purified feedstock is subsequently processed in a hydrotreatment stage in the presence of a hydrotreatment catalyst.

28. The process according to claim 21, wherein the feedstock is a renewable source obtained from a raw material of renewable origin.

29. The process according to claim 21, wherein the feedstock is a feedstock originating from combining a renewable source obtained from a raw material of renewable origin and a feedstock originating from a fossil fuel.

30. A guard bed for a hydrotreatment system, said guard bed comprising a porous material according to claim 1.

31. A hydrotreatment system for hydrotreating a feedstock, said hydrotreatment system comprising:
    a guard bed comprising a porous material according to claim 1; and
    a hydrotreatment section comprising at least one hydrotreatment catalyst, arranged downstream of said guard bed.

32. A method comprising a step of using a porous material according to claim 1 as a phosphorus guard in a hydrotreatment process.

\* \* \* \* \*